United States Patent [19]
Barlow

[11] 3,945,049
[45] Mar. 23, 1976

[54] PROTECTIVE GLOVES

[75] Inventor: Terence William Barlow, Marple, England

[73] Assignee: Barlow's Coated Fabrics Limited, Marple, England

[22] Filed: Mar. 10, 1975

[21] Appl. No.: 556,646

Related U.S. Application Data

[63] Continuation-in-part of Ser. No. 282,564, Aug. 21, 1972, abandoned.

[52] U.S. Cl. .................... 2/169; 2/167; 156/251; 156/269; 156/280; 156/290
[51] Int. Cl.² A41D 19/02; B32B 7/10; B32B 31/18; B32B 31/20
[58] Field of Search .......... 156/251, 250, 269, 280, 156/290, 510, 581, 583; 2/167, 168, 169; 158, 159

[56] References Cited
UNITED STATES PATENTS

| | | | |
|---|---|---|---|
| 3,007,835 | 11/1961 | Rosenberg et al. | 2/167 |
| 3,026,531 | 3/1962 | Holaday | 2/167 |
| 3,132,348 | 5/1964 | Frenkel et al. | 2/167 |
| 3,268,355 | 8/1966 | Brodeur, Jr. | 2/167 |
| 3,384,083 | 5/1968 | Cozza et al. | 2/167 |
| 3,625,790 | 12/1971 | Ayres | 156/251 |

Primary Examiner—William A. Powell
Assistant Examiner—M. G. Wityshyn
Attorney, Agent, or Firm—Ross, Ross & Flavin

[57] ABSTRACT

A process for the manufacture of gloves comprising: pre-coating a light-weight textile fabric substrate on one side only when a foamed dispersion consisting of a synthetic rubber and polyvinyl chloride; curing the dispersion; superposing two plies of the pre-coated fabric with their pre-coated surfaces in contact; welding together the two pieces of fabric along a welding zone in the shape of the outline of a hand; cutting out the shape thus defined using a shaped knife through the welding zone; turning the so-formed glove-shell inside out to bring the pre-coating to the outside; placing the inverted glove-shell onto a form in the shape of a hand; and dipping the form and the precoated outer surface of the glove shell mounted on the form into a liquid plastics material to provide an impervious outer coating, such outer coating being prevented from striking through into the fabric due to the pre-coating of the fabric.

5 Claims, 6 Drawing Figures

PROTECTIVE GLOVES

This is a continuation-in-part of my co-pending application Ser. No. 282,564, filed Aug. 21, 1972, now abandoned.

This invention relates to improvements in the manufacture of protective gloves.

Protective gloves are worn in many occupations either to protect the wearer from contamination by materials with which he is working, as in the chemical industries, or to protect materials from contamination by the wearer, as in surgical use, bakeries and similar applications where strict hygiene is required.

At the present time, there is a progressive trend, in industries such as automobile manufacture, for each employee to be issued with a fresh pair of protective gloves at the beginning of each shift, these being discarded at the end of the shift. Accordingly, economy of manufacture is of primary importance.

There is, however, the additional problem of ensuring that the gloves, once issued, are actually used by the employee. Relatively heavy or stiff gloves are felt to be inhibitive and are disliked. Therefore, not only must they be cheap to produce, but they should also be light in weight and supple so that the user does not regard their use as disadvantageous. The invention seeks to achieve this.

In a known process for manufacturing protective gloves, comparatively heavy (6 ounces per square yard) knitted interlock fabric is cut out into spread hand shapes, and two such shapes are sewn together to provide a glove lining. The lining is then stretched onto a form, in the shape of a spread-fingered hand, and dipped into a sol of an appropriate natural or synthetic rubber or plastics material. This plastisol tends to "strike-through" the fabric, filling up the pores between threads by capillary action.

This known process has disadvantages in that a comparatively heavy fabric has to be used, and because of manual cutting and sewing, uniformity of size and shape as between pairs of gloves nominally of the same size has been difficult to maintain. The strike-through of the plastisol has tended also to produce a stiffer glove than is desirable from the point of view of use during manipulative operations, and than might be expected from the properties of the coating materials and the lining materials used, as, in the strike-through zone, the coating and lining are mutually reinforcing.

In order to obtain a glove with improved flexibility, according to the present invention, the lining fabric is first pre-coated with a plastics material in the form of a dispersion, such dispersion consisting principally of nitrile-based polymer (i.e. synthetic rubber) to which a proportion (for example up to 15% w/w) of polyvinyl chloride has been added.

Arising from this pre-coating of the lining fabric, the invention further proposes that the process for production of the glove linings should preferably be automated, this being possible since the pre-coating enables plies of the fabric to be welded together.

The machine thus provided may comprise one or more welding heads shaped in the outline of a spread hand to weld two pieces of the pre-coated fabric together, either thermally or by high frequency welding. Additionally, the machine comprises a cutting knife, shaped like the welding head to cut out a spread-hand shape. The cutting knife is actuated after the welding head to cut along the weld seams providing a welded glove lining.

In the preferred process of the invention, the lining is then turned inside out, so that the weld seam which was exposed is now turned inwards.

The lining is then placed on a form, in the shape of a spread hand, and dipped in a sol of a suitable plastics or rubber material to coat the lining on the outer surface with a layer of the plastics or rubber. Due to the presence of the pre-coating, the sol does not strike through the interlock fabric, since the pores of the fabric are already sealed and no capillary action takes place.

The object of the invention is to provide a method of making a PVC-coated glove which on the one hand is inexpensive and on the other hand is light and supple, so that its use will not be regarded as inconvenient.

In practice this is achieved by:

a. starting with what really is a light weight fabric, namely a plain knit or jersey fabric of weight about 4 to 4.2 ozs. per square yard. It is thinner than the interlock fabrics conventionally used. It will be understood, of course, that "interlock" fabrics of the same order and weight, of from 4 to 4.2 ozs. per square yard can, if desired, be employed in the invention;

b. this light weight fabric is pre-coated (not impregnated) on one side only with a dispersion consisting principally of nitrile-based polymer (i.e. synthetic rubber) but including also a proportion of polyvinyl chloride and also a soap, the dispersion being in a frothed condition (e.g. by being agitated) when applied to the fabric;

c. the pre-coating is effected by passing the fabric in web form beneath a doctor blade which spreads the pre-coating thinly over the fabric, the fabric being unsupported from below in correspondence with the doctor blade, and then curing the pre-coating by passing the pre-coated fabric through an oven. The pre-coating does not soak into the fabric in the sense of passing right through but simply adheres to the surface to fill its pores and interstices. This is in contrast to the more conventional spreading by means of a doctor blade wherein the web is supported from below (e.g. by a roller) in register with the doctor blade which, accordingly, tends to force the coating through the web;

d. two plies of the pre-coated fabric are now superimposed with their pre-coated surfaces in contact, and these are welded together, and severed;

e. this gives the fabric shell which, although being of light weight fabric, is not susceptible to striking through in the subsequent dippings;

f. the fabric shell is turned inside out to bring the pre-coating to the outside;

g. the shell is then pulled onto a former 26 and is dipped into PVC plastisol; and the resultant plastisol outer coating is anchored in place on the pre-coating by being cured.

Applicant's method achieves the advantage of:

a. reducing costs by eliminating sewing;

b. reducing costs by permitting use of much lighter weight fabric for the liner; yet at the same time avoiding strike-through; and c. ensuring a supple and commercially-acceptable product.

The manufacture of a protective glove, according to the invention, will now be further described, with reference to the accompanying drawings, wherein.

Figure 1:
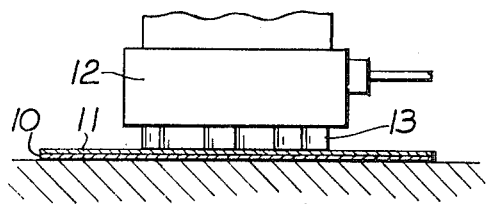
FIG. 1 shows diagrammatically a welding head being used to weld together two sheets of base material pre-coated with a dispersion in accordance with the invention, along a seam shaped in the form of an outspread hand.

In the first stage of the manufacture, which is not illustrated in the drawings, a web of interlock knitted fabric is pre-coated on one side in a continuous pre-coating process with a dispersion consisting of a nitrile-based polymer (synthetic rubber) to which a relatively small percentage of polyvinyl chloride has been added, the dispersion incorporating a soap and being frothed or formed while being applied by being agitated, spreading of the dispersion being effected by a doctor blade contacting the fabric at an unsupported portion of the latter. The pre-coating spreads over the knitted fabric, filling the pores and interstices of its outer surface but without soaking in, and the fabric is then passed through an oven to cure the pre-coating.

In the next stage, as shown in FIG. 1, two sheets of the pre-coated fabric 10 and 11 are laid on top of one another with the pre-coated surfaces in contact, and a welding head 12 which carries a plurality of welding blades 13 is brought down on the sheets. The blades are each shaped in the manner of an outspread hand to give a welded seam 14 of the shape shown in FIG. 2. The welding head 12 may for example carry sufficient blades 13 to make the fullest use of a roll of coated fabric measuring a yard in width. The blades 13 on the head 12 may be arranged in two staggered rows with the hand-shapes pointed in opposed directions so that the "wrist" parts are interspersed.

The welding is carried out by electrically heating the blade 13 so that the pre-coatings on the two sheets 10 and 11 fuse in the welding zone, and are united on cooling to produce the welded seam 14. It is the polyvinyl chloride component of each pre-coating which permits the welding, of course, the nitrile-based polymer being substantially non-weldable. If the welding together of the plies is effected by high frequency welding, a stack of the sheets about fourteen sheets high (to produce seven glove shapes) can be welded simultaneously.

Figure 2:
FIG. 2 shows diagrammatically the welded material produced by the step illustrated in FIG. 1.

Referring to FIG. 2, the seam 14 divides the area of fabric shown into two areas. The first is an enclosed area 15 within the seam 14. The parts of the sheet here are joined around the palm and finger outline to form the sides of the liner, but the wrist part is left open and unwelded. The other is an area 16 of fabric not used in forming the glove liner which is trimmed off by a knife 20 shown in FIG. 3.

Figure 3:
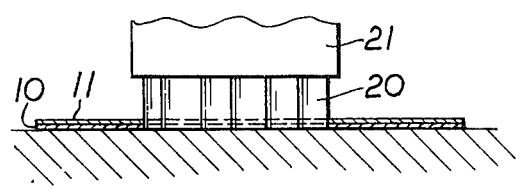
FIG. 3 shows diagrammatically a shaped knife being used to cut out the welded hand shape by severing along the seams provided by the welding step and also across the wrist part thereof.

In FIG. 3 a plurality of knives 20 are arranged on a cutting out head 21 and disposed in an identical pattern to that of the welding blades, so that the knives cut the fabric through the weld zones 14 and across the wrist parts.

Figure 4:
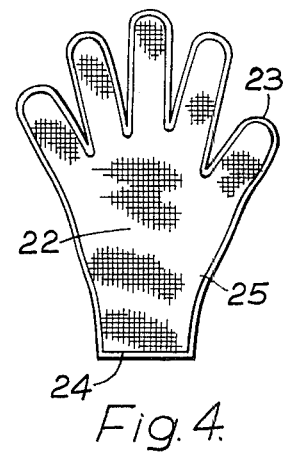
FIG. 4 shows diagrammatically the hand shaped glove-liner produced by the steps illustrated in FIGS. 1 and 3.

The product of this cutting step is shown in FIG. 4, and it comprises front and rear panels 22 joined around the fingers and the sides of the palm with a weld-bar 23 left by the knives. The wrist part 24 is of course unwelded and open.

Figure 5:
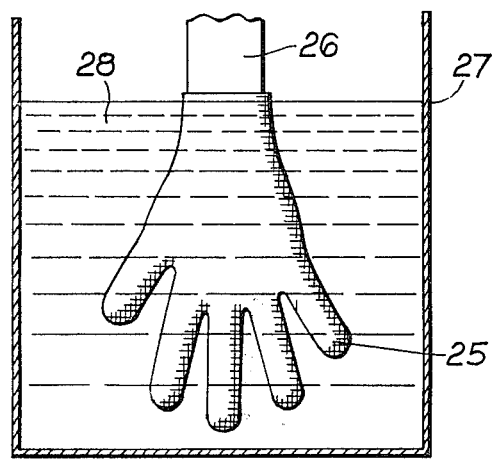
FIG. 5 shows diagrammatically the liner stretched on a hand-shaped form and dipped into a bath of an outer coating material.

The liner 25 thus formed is then turned inside out, so that the surfaces showing in FIG. 4 become the inner surfaces of the liner 25 and the weld-bar 23 is hidden in the interior. The liner 25 is placed on a form 26 which is shaped like a hand with outspread fingers The liner 25 on the form 26 is then dipped, preferably as one of a batch, into a bath 27 of an outer coating substance 28, as is shown in FIG. 5.

The outer coating substance can be a natural or synthetic rubber, or a suitable synthetic plastics material such as, especially, polyvinyl chloride, or a blend thereof. The form with the outer coated liner is withdrawn from the bath and the outer coating is allowed to set or is cured.

Figure 6:
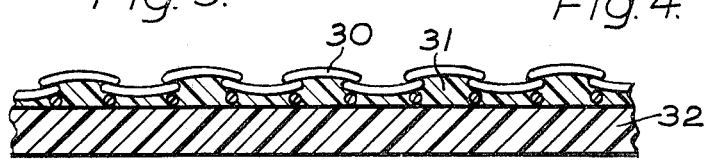
FIG. 6 is a diagrammatic fragmentary cross-sectional view of part of the finished protective glove according to the invention.

FIG. 6 is an enlarged diagrammatic cross-section of part of the finished glove. Loops 30 of the knitted fabric 10 or 11 are pre-coated on one side with the pre-coating 31 which was applied before application of the welding head 12. This seals the interstices of the loops at one side of the fabric and covers each of the threads making up one surface of the fabric. An outer coating of polyvinyl chloride 32 overlies this one side, forming a continuous outer skin. As the coating 31 seals the gaps between the threads, the outer layer 32 does not strike through between the threads, and forms simply a continuous skin.

The resulting glove is very flexible since the lining and outer coating are not mutually reinforcing, so that the glove can be worn while delicate manipulative operations are carried out. This is advantageous, particularly in chemical and research establishments, and also in general use of the glove.

The lining fabric used is a four ounces to the square yard interlock knit, a comparatively light knit which can be used due to the method of the invention. The lining fabric is pre-coated in bulk by the described doctor blade arrangement which provides an even coating of about 1 to 1.5 ounces per square yard over all the fabric.

Suitable outer coating materials are that sold by Plus Products Limited, of Blaydon-on-Tyne, Country Durham, England under their reference C-851 synthetic compound, and that sold by Industrial Latex Adhesives Limited, of Heywood, Lancashire, England under their reference LDA 163. The outer coating is applied as a dispersed sol of the material.

The method according to the invention, using mechanical cutting, and welding of the glove linings enables constancy of shape and dimensions for gloves of each standard size to be maintained. This is obviously advantageous as manual methods lead to discrepancies which differ in seriousness depending upon the skill and attentiveness of the worker.

I claim:

1. A process for the manufacture of gloves comprising:
   a. pre-coating a light-weight textile fabric substrate on one side only with a dispersion consisting principally of nitrile-based polymer together with a proportion of polyvinyl chloride and soap, the dispersion being applied in a foamed condition and adhering to the outer surface of the fabric to fill its pores and interstices but not soaking completely through the fabric;

b. curing the dispersion;

c. superposing two plies of the pre-coated fabric with their pre-coated surfaces in contact;

d. welding together the two pieces of the fabric along a welding zone in the shape of the outline of a hand;

e. cutting out the shape thus defined using a shaped knife through the welding zone;

f. turning the so-formed glove-shell inside out to bring the pre-coating to the outside;

g. placing the inverted glove-shell onto a form in the shape of a hand; and h. dipping the form and the pre-coated outer surface of the glove shell mounted on the form into a liquid plastics material to provide an impervious outer coating, such outer coating being prevented from striking through into the fabric due to the pre-coating of the fabric.

2. In the process according to claim 1, the polyvinyl chloride being present in the pre-coating dispersion in an amount up to about 15% w/w.

3. In the process according to claim 1, wherein the liquid plastics material providing the impervious outer coating is polyvinyl chloride plastisol.

4. In the process according to claim 1, wherein the pre-coating is applied by a doctor blade, the fabric being unsupported at the area of the doctor blade.

5. A glove formed by the process of claim 1.

* * * * *

UNITED STATES PATENT OFFICE
CERTIFICATE OF CORRECTION

PATENT NO. : 3,945,049
DATED : March 23, 1976
INVENTOR(S) : Terence William Barlow It is certified that error appears in the above-identified patent and that said Letters Patent are hereby corrected as shown below:

In the heading, delete lines 4 and 5 thereof, reading "[73] Assignee: Barlow's Coated Fabrics Limited, Marple, England"

Signed and Sealed this

Twentieth Day of July 1976

[SEAL]

Attest:

RUTH C. MASON
*Attesting Officer*

C. MARSHALL DANN
*Commissioner of Patents and Trademarks*